(12) United States Patent
Wu et al.

(10) Patent No.: US 8,879,026 B2
(45) Date of Patent: Nov. 4, 2014

(54) ELECTRONIC DEVICE COMPRISING A LIGHT GUIDE HAVING AN IMAGE LIGHT AREA AND AN INVALID LIGHT AREA WHEREIN A DECAY RATIO OF A LIGHT BEAM IN THE INVALID LIGHT AREA IS 0~15% OR 85~100%

(71) Applicant: Wistron Corp., New Taipei (TW)

(72) Inventors: Wen-Chin Wu, New Taipei (TW);
Chih-Kang Chen, New Taipei (TW);
Kuo-Hsing Wang, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/244,125

(22) Filed: Apr. 3, 2014

(65) Prior Publication Data

US 2014/0211126 A1 Jul. 31, 2014

Related U.S. Application Data

(62) Division of application No. 13/115,020, filed on May 24, 2011, now Pat. No. 8,767,144.

(30) Foreign Application Priority Data

May 25, 2010 (TW) .................. 99116635 A

(51) Int. Cl.
*G02F 1/1335* (2006.01)
*F21V 7/04* (2006.01)
*F21V 8/00* (2006.01)
*G02F 1/1333* (2006.01)

(52) U.S. Cl.
CPC ........ *G02B 6/0081* (2013.01); *G02F 1/133608* (2013.01); *G02F 1/133606* (2013.01); *G02F 2001/13332* (2013.01); *G02F 2001/133618* (2013.01)
USPC .............................. 349/65; 362/605; 362/612

(58) Field of Classification Search
USPC ............ 349/61–65; 362/97.1–97.3, 600, 605, 362/612, 616, 633
See application file for complete search history.

(56) References Cited

U.S. PATENT DOCUMENTS

2002/0191131 A1* 12/2002 Ota et al. ...................... 349/110

FOREIGN PATENT DOCUMENTS

KR 1020060000051 * 1/2006

* cited by examiner

*Primary Examiner* — Paul Lee

(57) ABSTRACT

An electronic device is provided. The electronic device includes a light source, a light guide, a display unit and a frame. The light source provides a light beam. The light guide includes a light emitting surface and a light entering surface, wherein the light beam enters the light guide through the light entering surface, and is emitted from the light emitting surface. The display unit is corresponding to the light emitting surface, wherein the light beam is partially emitted from the light guide, passes through the display unit to display an image. The frame covers the display unit and the light guide, wherein the frame has a display portion and a transparent portion, the image is displayed in the display portion, and the light beam is partially emitted from the light guide toward the transparent portion and passes through the transparent portion.

16 Claims, 4 Drawing Sheets

US 8,879,026 B2

ELECTRONIC DEVICE COMPRISING A LIGHT GUIDE HAVING AN IMAGE LIGHT AREA AND AN INVALID LIGHT AREA WHEREIN A DECAY RATIO OF A LIGHT BEAM IN THE INVALID LIGHT AREA IS 0~15% OR 85~100%

CROSS REFERENCE TO RELATED APPLICATIONS

This application is a Divisional of pending U.S. patent application Ser. No. 13/115,020, filed May 24, 2011 and entitled "Electronic device", which claims priority of Taiwan Patent Application No. 099116635, filed on May 25, 2010, the entirety of which is incorporated by reference herein.

BACKGROUND OF THE INVENTION

1. Field of the Invention

The present invention relates to an electronic device, and in particular relates to an electronic device with ambiance light.

2. Description of the Related Art

For a conventional display, to provide ambiance light, an additional light source (for example, a light emitting diode) is required. Similarly, to light a logo or a function key of a display, an additional light source (for example, a light emitting diode) is also required. Therefore, costs are increased for conventional displays. Additionally, for a conventional display, the color and brightness variation of ambiance light is limited by the light emitting diode, and thus the patterns of illumination are also limited.

BRIEF SUMMARY OF THE INVENTION

An electronic device is provided. The electronic device includes a light source, a light guide, a display unit and a frame. The light source provides a light beam. The light guide includes a light emitting surface and a light entering surface, wherein the light beam enters the light guide through the light entering surface, and is emitted from the light emitting surface. The display unit is corresponding to the light emitting surface, wherein the light beam is partially emitted from the light guide, passes through the display unit to display an image. The frame covers the display unit and the light guide, wherein the frame has a display portion and a transparent portion, the image is displayed in the display portion, and the light beam is partially emitted from the light guide toward the transparent portion and passes through the transparent portion.

Utilizing the embodiment of the invention, the ambiance light through the transparent portion is obtained from the light guide, and therefore no additional light source (light emitting diode) is required. Additionally, the display unit is along the light path of the ambiance light. The color and brightness of the ambiance light can be modified by the display unit to provide various illumination patterns.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is one of the contemplated modes of carrying out the invention. This description is made for the purpose of illustrating the general principles of the invention and should not be taken in a limiting sense. The scope of the invention is best determined by reference to the appended claims.

Figure 1:
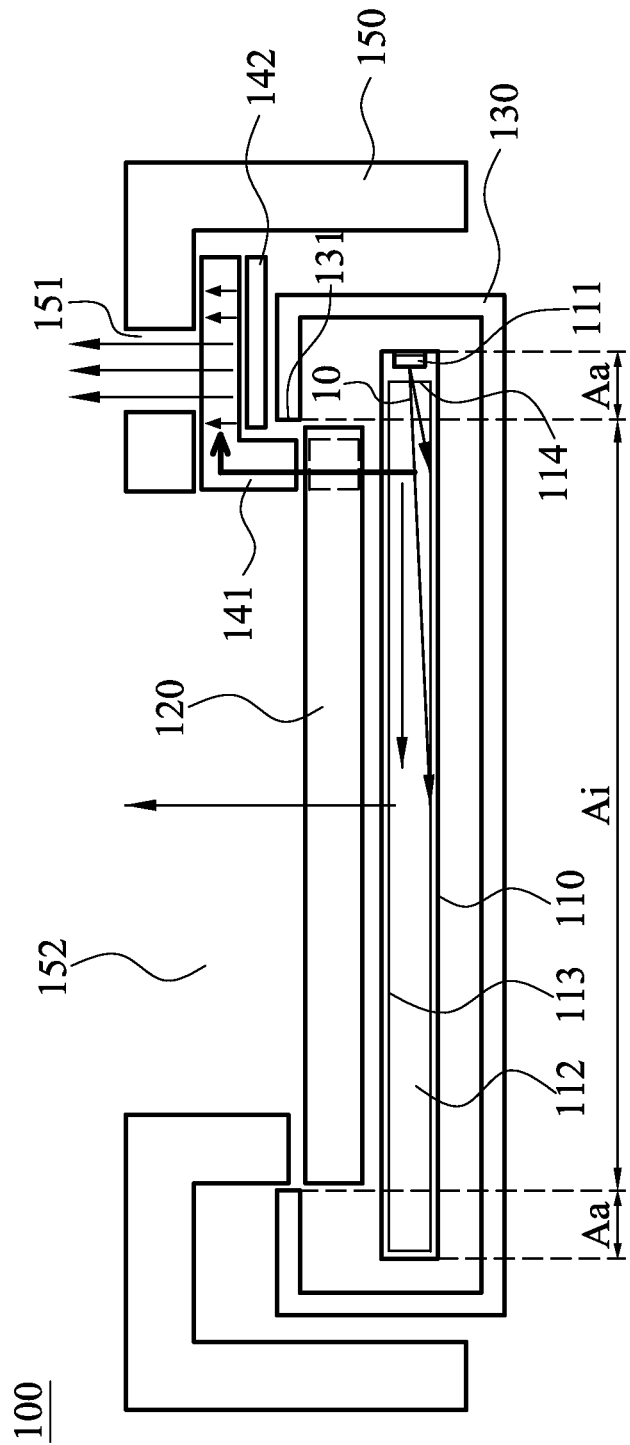
FIG. 1 shows an electronic device (display device) of a first embodiment of the invention.

FIG. 1 shows an electronic device (display device) 100 of a first embodiment of the invention, including a backlight module 110, a display unit 120, a fixing frame 130, an ambiance light guiding unit 141 and a cover frame 150. The backlight module 110 includes a light source 111 and a light guide 112. The light source 111 provides a light beam 10. The light guide 112 includes a light emitting surface 113 and a light entering surface 114. The light emitting surface 113 is perpendicular to the light entering surface 114. The light beam 10 enters the light guide 112 through the light entering surface 114, and is emitted from the light emitting surface 113. The display unit 120 is corresponding to the light emitting surface 113. The light beam 10 partially passes through the display unit 120 to display an image. The fixing frame 130 fixes the backlight module 110 and the display unit 120. The ambiance light guiding unit 141 is corresponding to the light guide 112. The cover frame 150 covers the fixing frame 130, wherein the cover frame 150 has a display portion 152 and a transparent portion 151. The image is displayed in the display portion 152, and the light beam 10 partially passes through the light guide 112, guided by the ambiance light guiding unit 141 and is emitted from the transparent portion 151 to be ambiance light.

In one embodiment, the light beam 10 is emitted from the light guide 112, passes through the display unit 120 and the ambiance light guiding unit 141, and is guided by the ambiance light guiding unit 141 to be emitted from the transparent portion 151.

Utilizing the first embodiment of the invention, the ambiance light through the transparent portion is obtained from the light guide, and therefore no additional light source (light emitting diode) is required. Additionally, the display unit is in the light path of the ambiance light. The color and brightness of the ambiance light can be modified by the display unit to provide various illumination patterns.

In the first embodiment, the fixing frame 130 has a frame edge 131, the frame edge 131 defines an image light area Ai and an invalid light area Aa on the light guide 112, and the invalid light area Aa surrounds the image light area Ai. The image light area Ai is rectangular. Most part of the light beam 10 passes through the image light area Ai and the display unit 120 to display the image. Simultaneously, less part of the light beam 10 is emitted from the image light area Ai, passing through the display unit 120, guided by the ambiance light guiding unit 141, and is emitted from the transparent portion 151. In the first embodiment, the light entering the ambiance light guiding unit 141 is emitted from the image light area Ai.

In the first embodiment, the display unit 120 includes a liquid crystal layer, the fixing frame 130 is a metal frame, and the cover frame 150 is a plastic frame.

In this embodiment, the electronic device 100 further includes a reflector 142, wherein the ambiance light guiding unit 141 is partially located between the reflector 142 and the transparent portion 151. The light beam 10 enters the ambiance light guiding unit 141, reflected by the reflector 142, and is emitted from the transparent portion 151. However, the invention is not limited. In one embodiment, a reflective means (for example, a reflective pattern) can be formed on the surface of the ambiance light guiding unit 141, and the reflector can be omitted.

Figure 2:
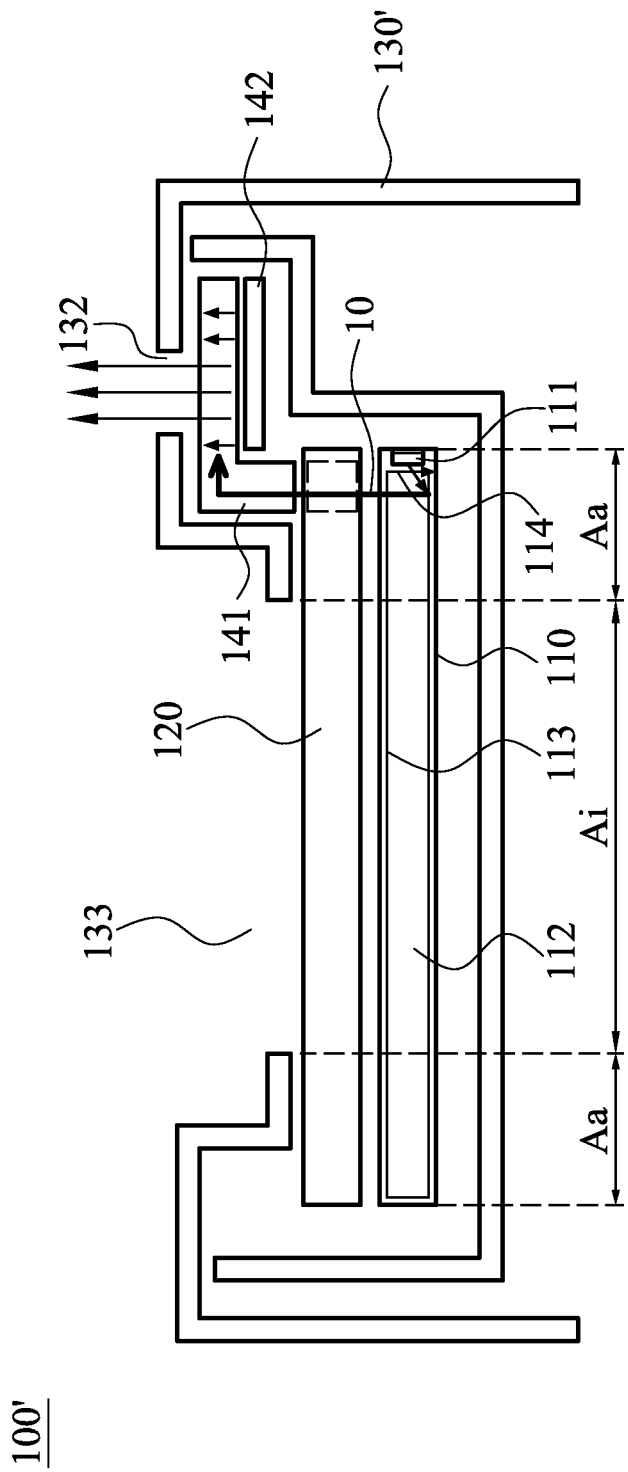
FIG. 2 shows an electronic device of a second embodiment of the invention.

FIG. 2 shows an electronic device 100' of a second embodiment of the invention, which is characteristic in that the fixing frame 130' is also an external member, and the cover frame is omitted. In this embodiment, the light beam 10 is emitted from the invalid light area Aa, passes through the display unit 120, enters the ambiance light guiding unit 141, and is guided by the ambiance light guiding unit 141 to be emitted from the transparent portion 132. In the second embodiment, the light entering the ambiance light guiding unit 141 is obtained from the invalid light area Aa, wherein the light beam provided by the light source 111 is sufficiently used. Conventionally, the light emitted from the invalid light area Aa may generate a bright or dark spot, and is not utilized for displaying images. Additionally, decay ratio of the light beam 10 can also be utilized for defining invalid light area Aa. In the description of the invention, decay ratio of the light beam 10 is 0% when a distance from the light source 111 is zero. The decay ratio of the light beam 10 in the invalid light area Aa is 0~15% or 85~100%

In a modified example, while the light entering the ambiance light guiding unit 141 is emitted from the invalid light area Aa, a cover frame may still be utilized. The embodiments do not limit the invention.

Figure 3:
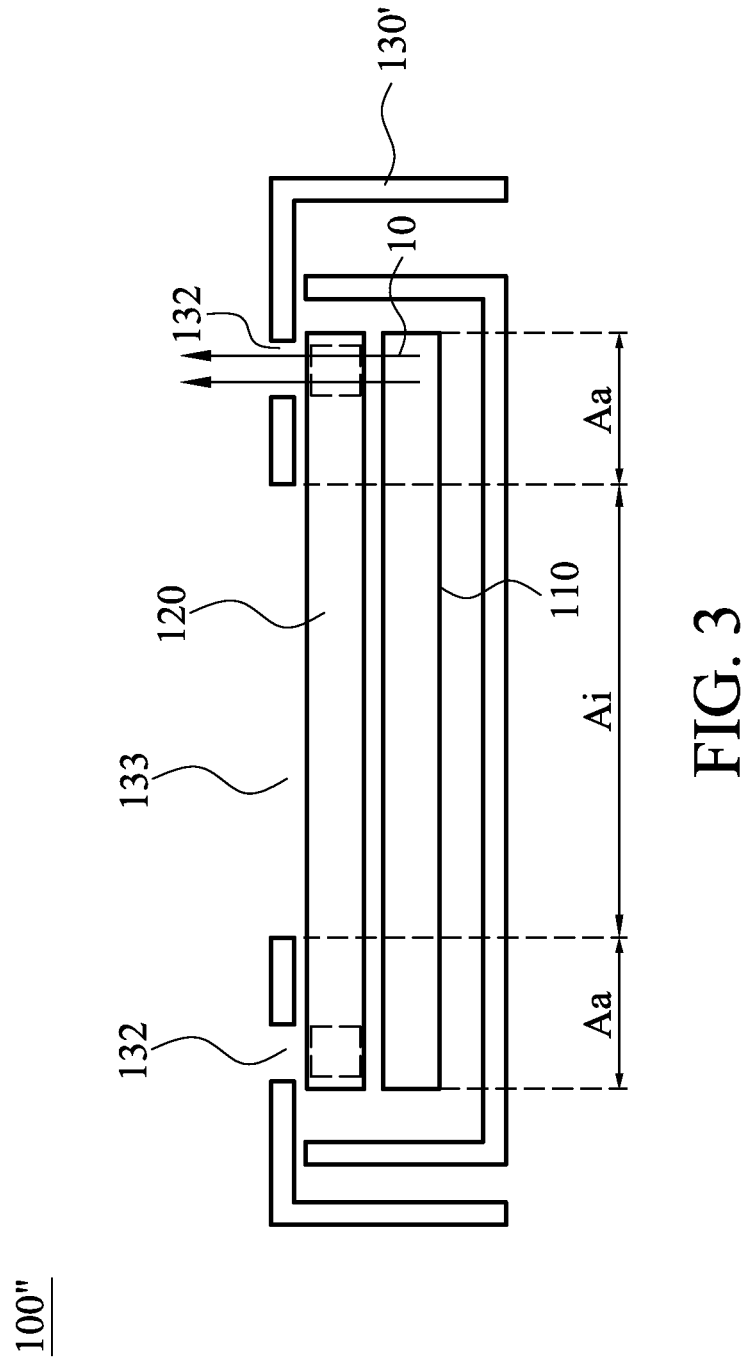
FIG. 3 shows an electronic device of a third embodiment of the invention.

FIG. 3 shows an electronic device 100" of a third embodiment of the present invention, which is characteristic in that the ambiance light guiding unit is omitted. The fixing frame 130' has a display portion 133 and a transparent portion 132. The light beam 10 partially passes through the image light area Ai and the display unit 120 to display an image, wherein the image is displayed at the display portion 133. The light beam 10 partially passes through the invalid light area Aa and the display unit 120 then emitted from the transparent portion 132.

In the embodiments of FIGS. 1 and 2, side-lit backlight module is utilized in the electronic device. However, the invention is not limited thereto, and a direct-lit backlight module or other type backlight module can also be utilized in the electronic device of the present invention. FIG. 3 shows the electronic device utilizing any type of backlight module.

In the embodiments above, the light beam emitted from the invalid light area Aa passes through the display unit to become ambiance light. However, the invention is not limited thereto. In one embodiment, the light beam emitted from the invalid light area Aa does not pass through the display unit. In this embodiment, the light beam provided by the light source is also sufficiently used.

In one embodiment, the light guide includes in the bottom an image light reflective portion and an ambiance light reflective portion. The image light reflective portion is located in the image light area. The ambiance light reflective portion is located in the invalid light area. A plurality of image light reflective protrusions is formed in the image light reflective portion. A plurality of ambiance light reflective protrusions is formed in the ambiance light reflective portion. Density of the ambiance light reflective protrusions is greater than the density of the image light reflective protrusions.

Figure 4A:
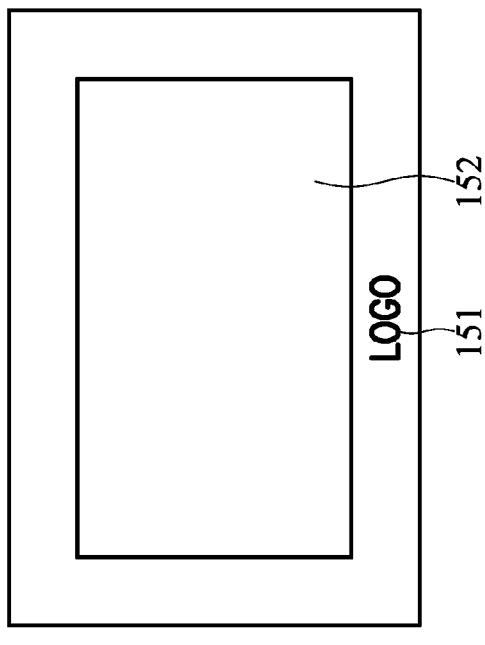
FIGS. 4A and 4B are front views of the electronic device of the embodiments of the invention.
Figure 4B:
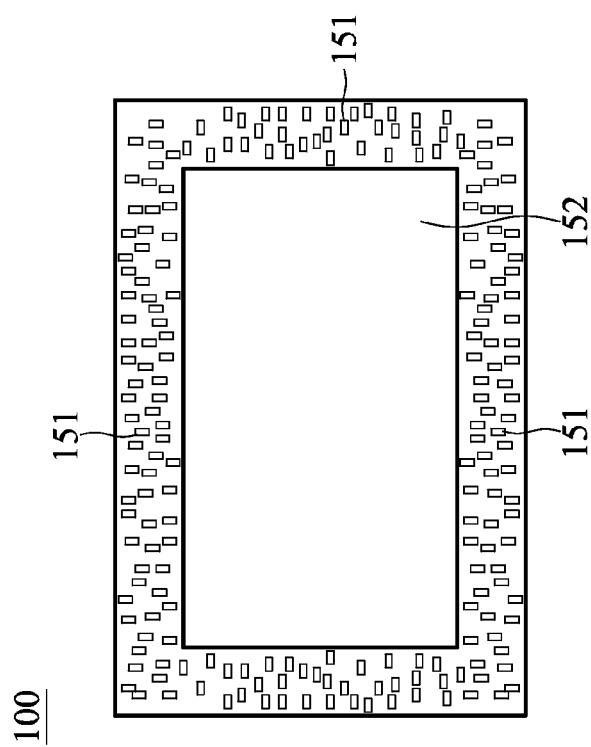

FIGS. 4A and 4B are front views of the electronic device 100 of the embodiments of the present invention. The transparent portion 151 can be protrusions of any shape, logo, or other transparent elements. The embodiments above do not limit the invention.

While the invention has been described by way of example and in terms of the embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a light source, providing a light beam;
a light guide, comprising a light emitting surface and a light entering surface, wherein the light beam enters the light guide through the light entering surface, emitted from the light emitting surface, the light guide has an image light area and an invalid light area, and a decay ratio of the light beam in the invalid light area is 0~15% or 85~100%;
a display unit, corresponding to the light emitting surface, wherein the light beam is partially emitted from the image light area, and passes through the display unit to display an image;
an ambiance light guiding unit, corresponding to the light guide; and
a frame, covering the display unit and the light guide, wherein the frame has a display portion and a transparent portion, the image is displayed in the display portion, and a portion of the light beam is sequentially emitted from the light emitting surface, guided by the ambiance light guiding unit and is emitted from the transparent portion.

2. The electronic device as claimed in claim 1, wherein the decay ratio of the light beam in the invalid light area is 0~10% or 90~100%.

3. The electronic device as claimed in claim 1, wherein the decay ratio of the light beam in the invalid light area is 0~5% or 95~100%.

4. The electronic device as claimed in claim 1, wherein the light beam is emitted from the light guide, passes through the display unit and the ambiance light guiding unit, and is guided by the ambiance light guiding unit to be emitted from the transparent portion.

5. The electronic device as claimed in claim 1, wherein the light beam is emitted from the image light area, passes through the display unit and the ambiance light guiding unit, and is guided by the ambiance light guiding unit to be emitted from the transparent portion.

6. The electronic device as claimed in claim 1, wherein the light beam is emitted from the invalid light area, enters the ambiance light guiding unit, and is guided by the ambiance light guiding unit to be emitted from the transparent portion.

7. The electronic device as claimed in claim 1, wherein the display unit comprises a liquid crystal layer.

8. The electronic device as claimed in claim 1, wherein the fixing frame is a metal frame.

9. The electronic device as claimed in claim 1, wherein the cover frame is a plastic frame.

10. The electronic device as claimed in claim 1, wherein the light guide comprises an image light reflective portion and an ambiance light reflective portion, the image light reflective portion is located in the image light area, the ambiance light reflective portion is located in the invalid light area, a plurality of image light reflective protrusions is formed in the image light reflective portion, a plurality of ambiance light reflective protrusions is formed in the ambiance light reflective portion, and density of the ambiance light reflective protrusions is greater than density of the image light reflective protrusions.

11. The electronic device as claimed in claim 1, further comprising a reflector, wherein the ambiance light guiding unit is partially located between the reflector and the transparent portion, and the light beam in the ambiance light guiding unit is reflected by the reflector to be emitted from the transparent portion.

12. An electronic device, comprising:
- a light source, providing a light beam;
- a light guide, comprising a light emitting surface and a light entering surface, wherein the light beam enters the light guide through the light entering surface, and is emitted from the light emitting surface;
- a display unit, corresponding to the light emitting surface, wherein the light beam is partially emitted from the light guide, passes through the display unit to display an image; and
- a frame, covering the display unit and the light guide, wherein the frame has a display portion and a transparent portion, and the image is displayed in the display portion, arranged such that a portion of the light beam is sequentially emitted from the light emitting surface toward the transparent portion and then passes through the transparent portion to be ambiance light,
- wherein the light guide has an image light area and an invalid light area, a decay ratio of the light beam in the invalid light area is 0~15% or 85~100%, and the light beam is emitted from the invalid light area toward the transparent portion.

13. The electronic device as claimed in claim 12, wherein the light beam is partially emitted from the light guide, passes through the display unit to be emitted from the transparent portion.

14. The electronic device as claimed in claim 12, further comprising an ambiance light guiding unit corresponding to the light guide, wherein the light beam is partially emitted from the light guide, passes through the ambiance light guiding unit to be emitted from the transparent portion.

15. The electronic device as claimed in claim 12, wherein the light emitting surface is perpendicular to the light entering surface.

16. The electronic device as claimed in claim 12, wherein the light emitting surface is parallel to the light entering surface.

* * * * *